(12) United States Patent
Rosati

(10) Patent No.: US 12,289,061 B2
(45) Date of Patent: Apr. 29, 2025

(54) MODULAR DEVICE FOR THE STORAGE AND DELIVERY OF ELECTRICAL ENERGY

(71) Applicant: NHOA ENERGY S.R.L., Milan (IT)

(72) Inventor: Daniele Rosati, Trecate (IT)

(73) Assignee: NHOA ENERGY S.R.L., Milan (IT)

( * ) Notice: Subject to any disclaimer, the term of this patent is extended or adjusted under 35 U.S.C. 154(b) by 6 days.

(21) Appl. No.: 18/253,299

(22) PCT Filed: Nov. 22, 2021

(86) PCT No.: PCT/IB2021/060797
§ 371 (c)(1),
(2) Date: May 17, 2023

(87) PCT Pub. No.: WO2022/112914
PCT Pub. Date: Jun. 2, 2022

(65) Prior Publication Data
US 2024/0014746 A1  Jan. 11, 2024

(30) Foreign Application Priority Data
Nov. 27, 2020 (IT) .......................... 102020000028724

(51) Int. Cl.
*H02M 7/00* (2006.01)
*H01M 10/42* (2006.01)
(Continued)

(52) U.S. Cl.
CPC ......... *H02M 7/003* (2013.01); *H01M 10/425* (2013.01); *H01M 50/209* (2021.01);
(Continued)

(58) Field of Classification Search
CPC ........ H02M 7/003; H02M 7/797; H02M 7/00; H01M 50/209; H01M 50/249;
(Continued)

(56) References Cited

FOREIGN PATENT DOCUMENTS

| EP | 2815913 A1 | 12/2014 |
|----|------------|---------|
| EP | 3644395 A1 | 4/2020 |

OTHER PUBLICATIONS

The International Search Report and Written Opinion for PCT/IB2021/060797, mailed Feb. 9, 2022.
(Continued)

*Primary Examiner* — Hal Kaplan
(74) *Attorney, Agent, or Firm* — Vorys, Sater, Seymour and Pease LLP

(57) ABSTRACT

A modular device for accumulation and delivery of electrical energy, including a structure including a plurality of shelving, an air conditioning system, and at least one bi-directional electronic multi-level converter defining a transformerless AC/alternating current output and including three three-phase legs connected to the output and each including a plurality of modules connected in series, a plurality of inductors arranged on a respective output line from the legs, and a firmware control device to modify current and voltage output from the modules. Each of the modules includes a first stage AC output including an IGBT device, isolated to ground, capable of connecting in series with the other modules of a respective leg and capable of generating an output voltage waveform, a second DC/DC conversion stage defining an input, and at least one battery connected to the input. The battery is an electric vehicle battery (EVB).

15 Claims, 5 Drawing Sheets

Figure 1:
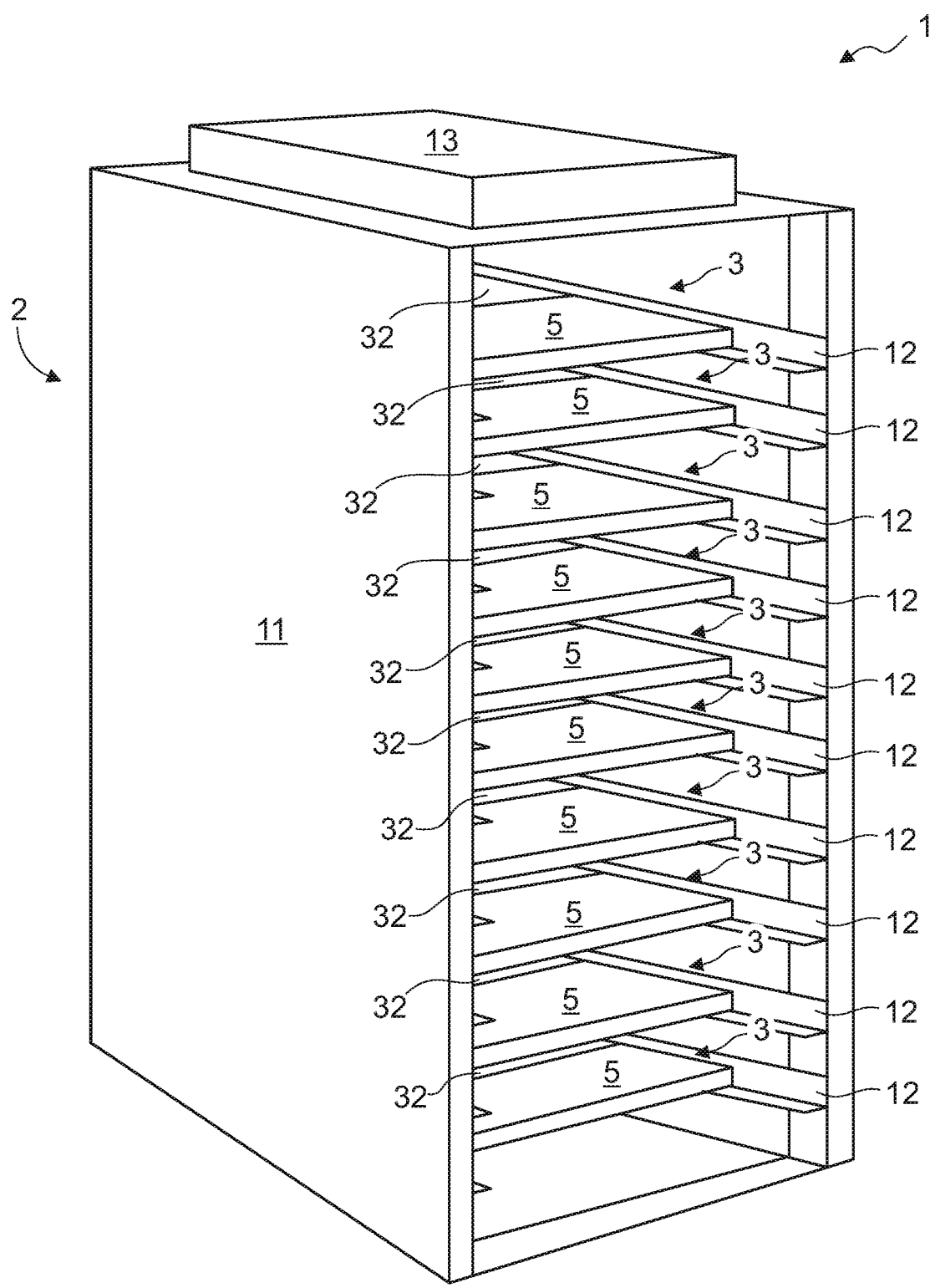

(51) Int. Cl.
*H01M 50/209* (2021.01)
*H01M 50/249* (2021.01)
*H01M 50/258* (2021.01)
*H01M 50/267* (2021.01)
*H01M 50/51* (2021.01)
*H02M 7/797* (2006.01)

(52) U.S. Cl.
CPC ....... *H01M 50/249* (2021.01); *H01M 50/258* (2021.01); *H01M 50/267* (2021.01); *H01M 50/51* (2021.01); *H02M 7/797* (2013.01); H01M 2010/4271 (2013.01); H01M 2220/20 (2013.01)

(58) Field of Classification Search
CPC .. H01M 50/258; H01M 50/267; H01M 50/51; H01M 10/425; H01M 2220/20; H01M 2010/4271; H01M 10/42
USPC .......................................................... 307/52
See application file for complete search history.

(56) References Cited

OTHER PUBLICATIONS

The Italian Search Report for IT 102020000028724, completed Jul. 22, 2021.

US 12,289,061 B2

1

MODULAR DEVICE FOR THE STORAGE AND DELIVERY OF ELECTRICAL ENERGY

The present invention relates to a modular device for the accumulation and delivery of electrical energy of the type specified in the preamble of the first claim.

Specifically, the present invention relates to a modular device for the accumulation and delivery of electrical energy controlled, in general, by means of a multi-level converter configured ad hoc.

Energy accumulation systems are currently known which provide groups of batteries for example, used as accumulation systems and systems of downstream of energy production plants, or as recharging systems for electric vehicles. Considering the high demand for batteries for modern technologies, such as the traction of electric vehicles, the use made of the batteries replaced at the end of the cycle is of central importance, still usable for different applications but which present problems related to the past use, such as the so-called "consistency" of second-hand batteries.

Furthermore, similar problems also occur in the case of accumulation systems that use different batteries.

The known art described, in this regard, includes some important drawbacks.

In particular, there are no systems or devices capable of using and optimizing the integration of batteries with different states of aging and construction characteristics.

Finally, there are no energy accumulation and delivery systems that couple different batteries with plug-and-play systems, i.e., without having to make specific changes or adaptations to the batteries if they have different construction characteristics or states of aging.

In this situation, the technical task underlying the present invention is to devise a modular device for accumulating and delivering electrical energy capable of substantially obviating at least part of the aforementioned drawbacks.

Within the scope of said technical task, an important object of the invention is to obtain a modular device capable of coupling batteries in states of aging and with different construction characteristics.

Another important object of the invention is to provide a device equipped with a plug-and-play system, which couples batteries of different types without modifications or adaptations to the same batteries.

Again, an important object of the invention is to provide a fail-safe modular device, capable of delivering energy even in the event of a fault in one of the accumulation modules that compose it.

Finally, an important object of the invention is to provide a device capable of controlling and optimizing a plurality of device parameters, such as voltage, current, state of charge, temperature management, state of wear and more of the batteries connected to the own modules.

The technical task and the specified aims are achieved by a modular system for the accumulation and delivery of electrical energy as claimed in the attached claim 1.

The preferred technical solutions are highlighted in the dependent claims.

Figure 2:
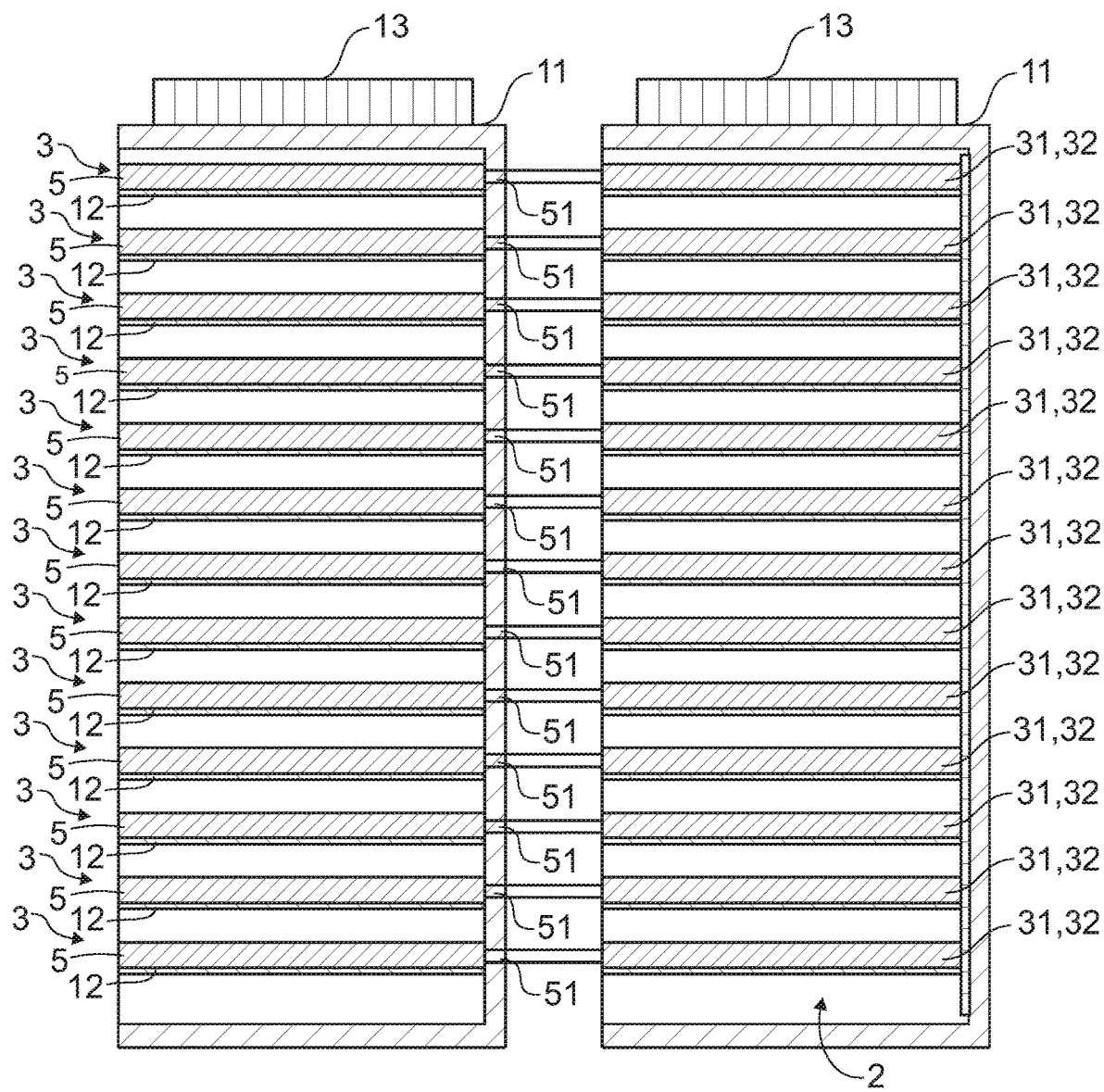
Figure 3:
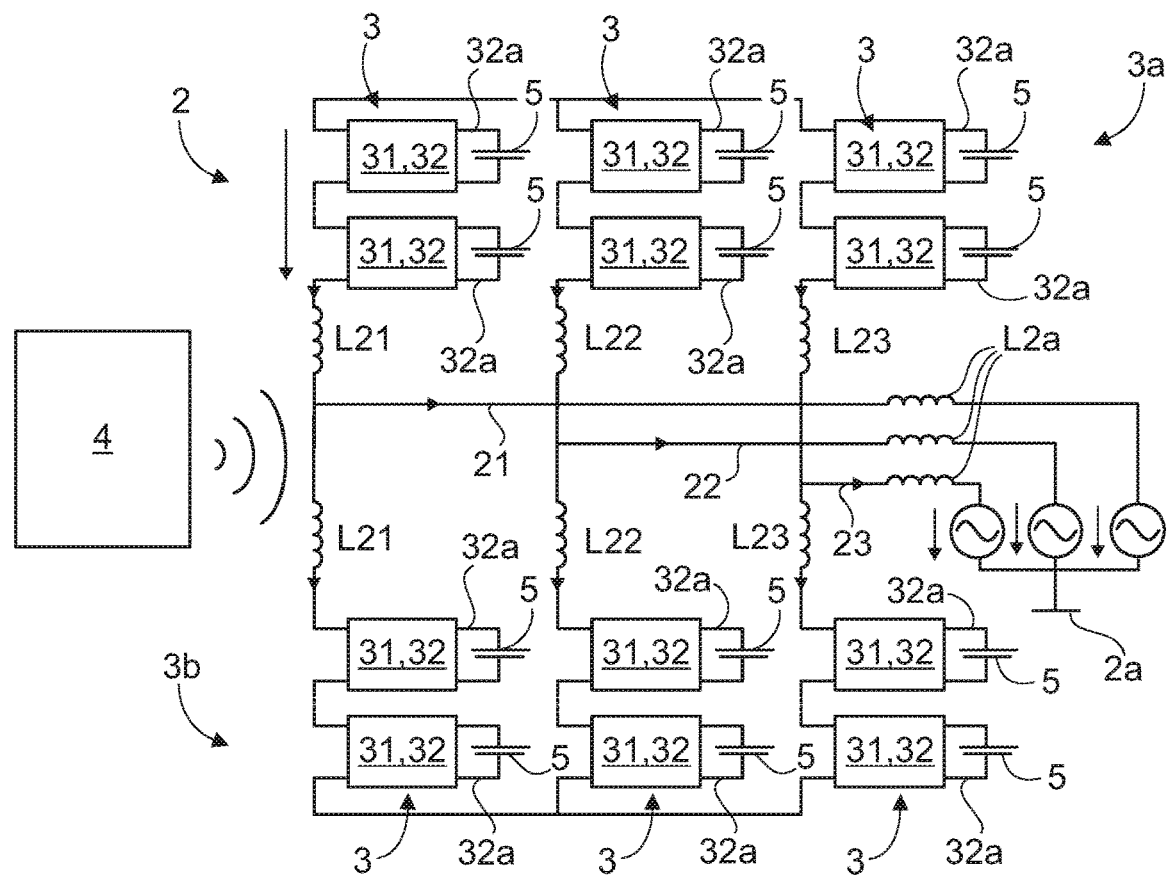
Figure 4A:
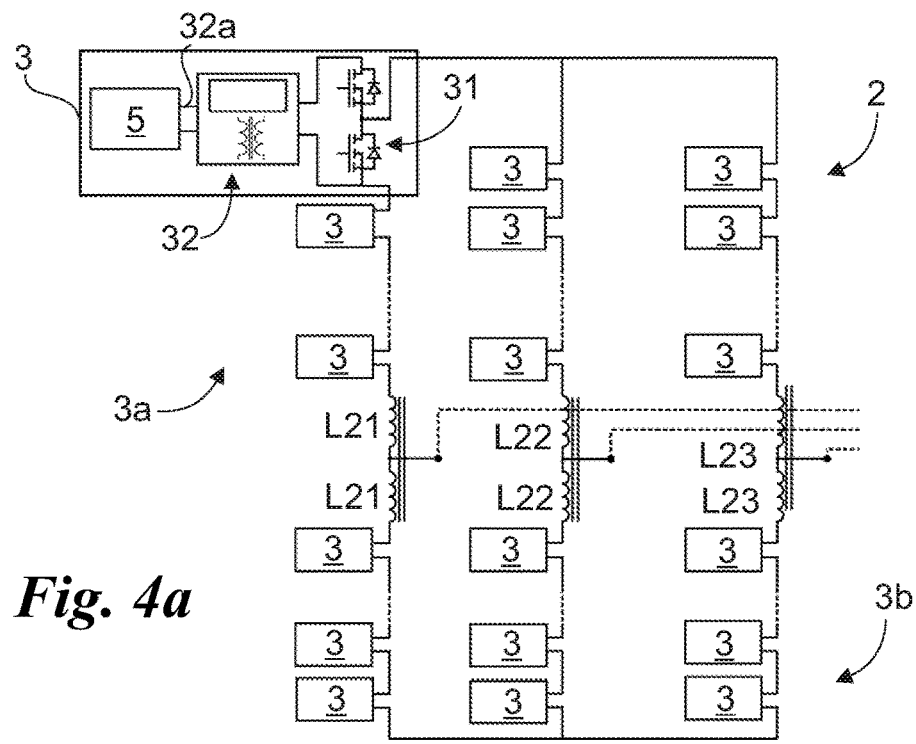
Figure 4B:
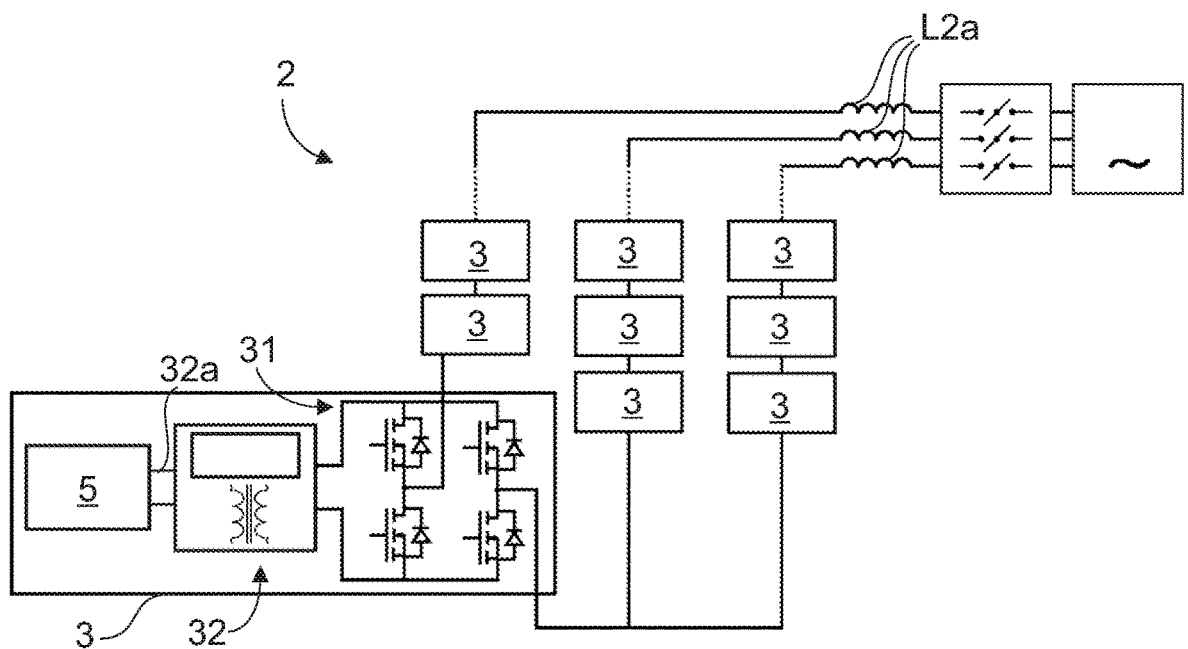
Figure 4C:
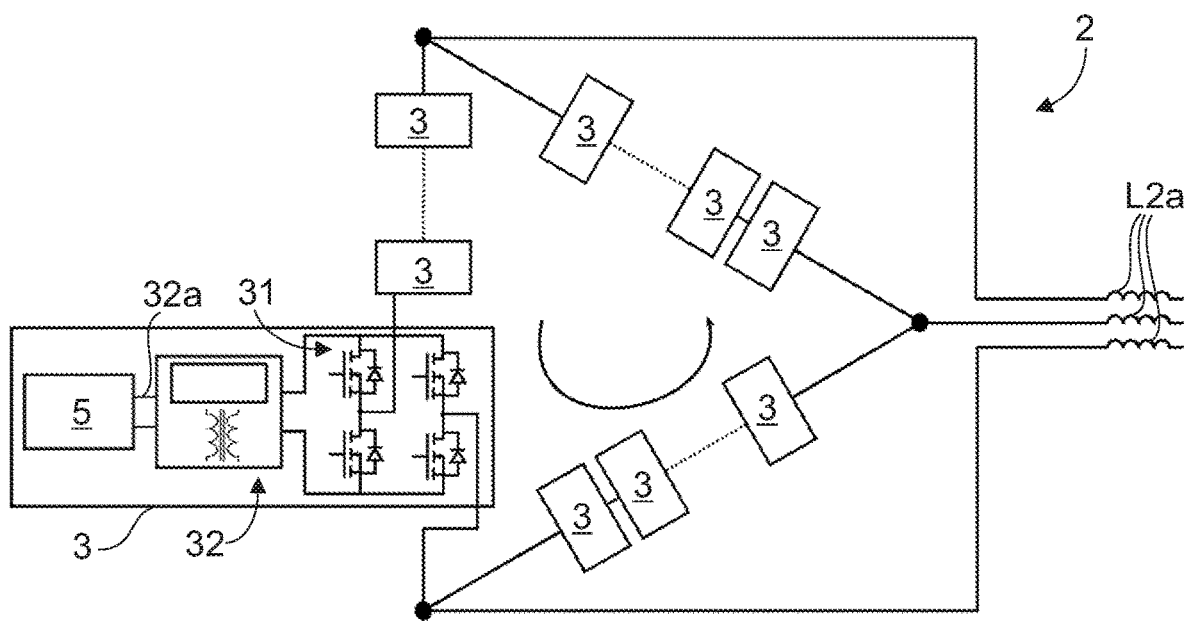
Figure 5A:
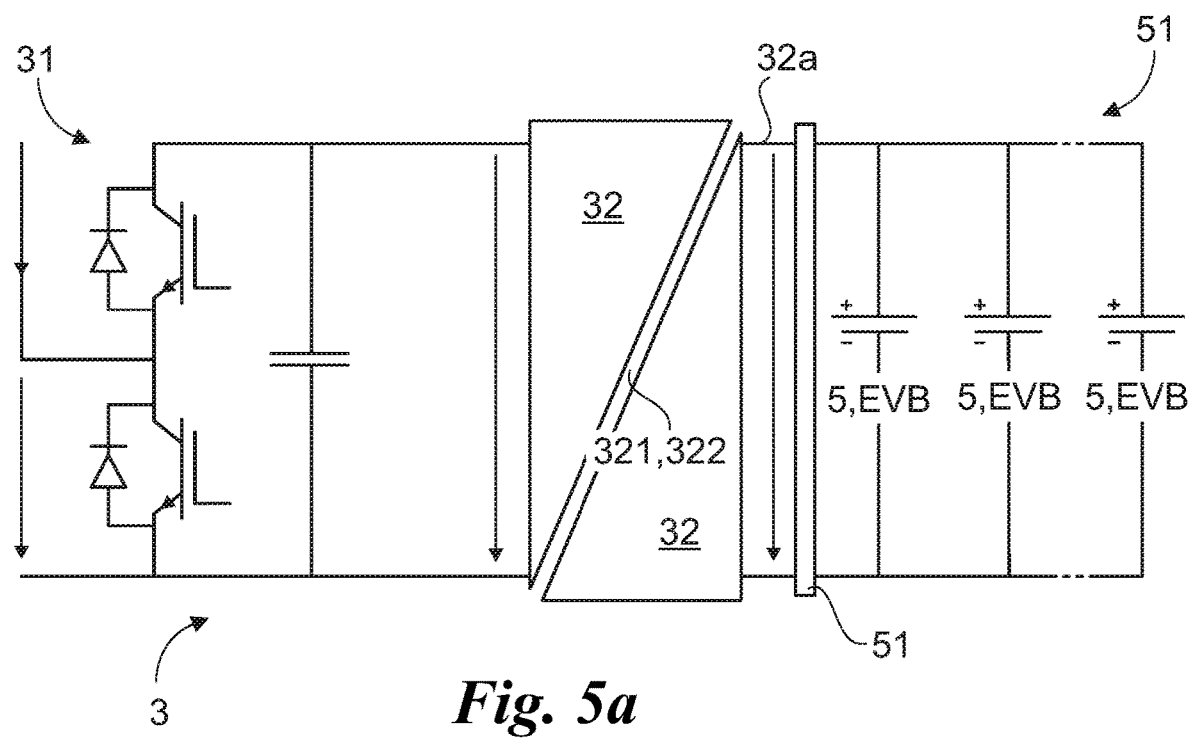
Figure 5B:
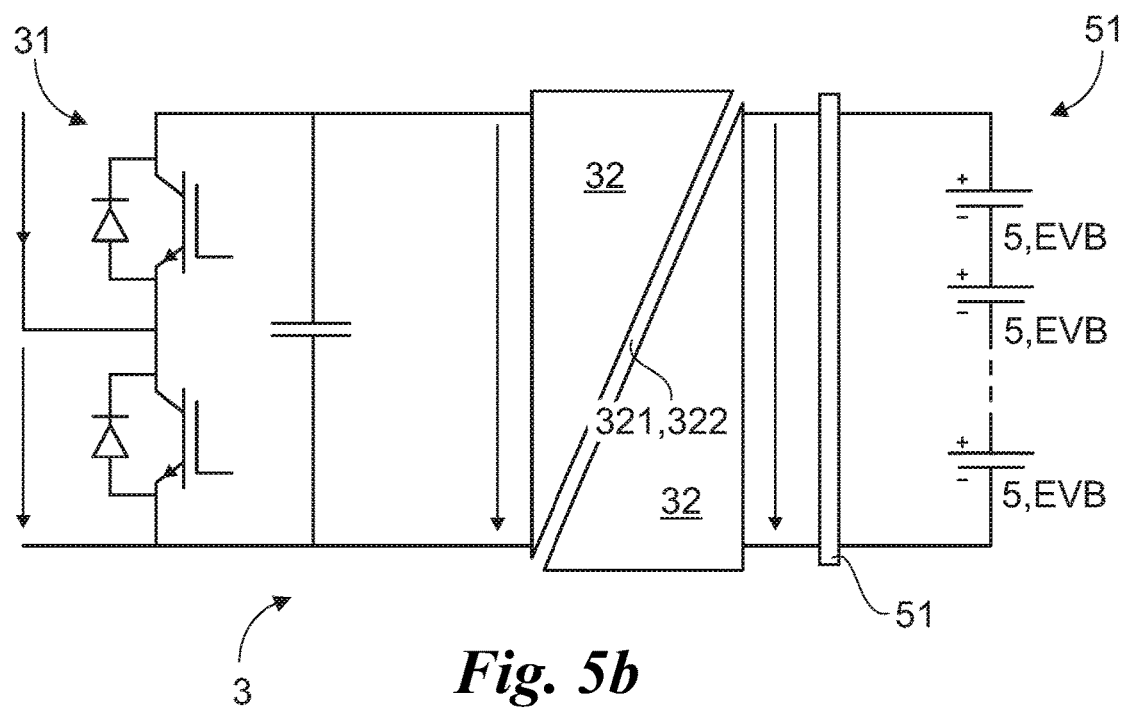

The characteristics and advantages of the invention are clarified below by the detailed description of preferred embodiments of the invention, with reference to the accompanying drawings, in which:

the FIG. 1 shows a schematic perspective view of a modular accumulation device and delivery of electrical energy according to the present invention wherein each rack comprises a single complete module, which is equipped with a battery and first and second stage;

2 the FIG. 2 illustrates a schematic sectional view of a modular accumulation device and delivery of electrical energy according to the present invention in which there are two structures including shelving respectively and separately the module batteries and the respective stages of the module connected to the batteries through multiple sockets;

the FIG. 3 is a first schematic electrical diagram of a bi-directional multi-level electronic converter included in a modular accumulation device and delivery of electrical energy according to the present invention;

the FIG. 4a is a further schematic view of FIG. 3 in which the converter is shown in detail a module;

the FIG. 4b represents a second exemplary circuit diagram of a bi-directional multi-level electronic converter included in a modular accumulation device and delivery of electrical energy according to the present invention;

the FIG. 4c represents a third exemplary circuit diagram of a bi-directional multi-level electronic converter included in a modular accumulation device and delivery of electrical energy according to the present invention;

the FIG. 5a illustrates an electrical diagram of a single accumulation module and distribution of energy of the converter of a modular device of the accumulation and delivery of electrical energy in which there are multiple batteries in parallel; and the FIG. 5b is an electrical diagram of a single accumulation module and distribution of energy of the converter of a modular device of the accumulation and delivery of electrical energy in which there are multiple batteries in series.

In the present document, the measurements, values, shapes and geometric references (such as perpendicularity and parallelism), when associated with words like "about" or other similar terms such as "approximately" or "substantially", are to be considered as except for measurement errors or inaccuracies due to production and/or manufacturing errors, and, above all, except for a slight divergence from the value, measurements, shape, or geometric reference with which it is associated. For instance, these terms, if associated with a value, preferably indicate a divergence of not more than 10% of the value.

Moreover, when used, terms such as "first", "second", "higher", "lower", "main" and "secondary" do not necessarily identify an order, a priority of relationship or a relative position, but can simply be used to clearly distinguish between their different components.

Unless otherwise specified, as results in the following discussions, terms such as "treatment", "computing", "determination", "calculation", or similar, refer to the action and/or processes of a computer or similar electronic calculation device that manipulates and/or transforms data represented as physical, such as electronic quantities of registers of a computer system and/or memories in, other data similarly represented as physical quantities within computer systems, registers or other storage, transmission or information displaying devices.

The measurements and data reported in this text are to be considered, unless otherwise indicated, as carried out in the ICAO International Standard Atmosphere (ISO 2533: 1975).

With reference to the Figures, the device for accumulating and delivery of electrical energy according to the invention is globally indicated with the number 1.

Preferably, as can be seen in FIGS. 1-2, the modular device 1 for accumulating and delivery of electrical energy comprises at least one structure 11 comprising a plurality of shelving (shelves) 12, and at least one bi-directional multi-level electronic converter 2 comprising a plurality of modules 3.

Preferably, the structure 11 is a rigid structure, for example metal, comprising the shelves 12.

Furthermore, the structure 11 can be closed or open. For example, the structure 11 may include, or consist of, a simple frame. Or, the structure 11 can be a container defining one or more stacked compartments and accessible from at least one direction.

The shelves 12 are therefore preferably removable. In particular, the shelving 12 house at least part of the device 1.

Preferably, each shelving 12 is configured to house an entire module 3 or at least part of it, as better explained later.

Furthermore, the device 1 could also include an air conditioning system 13. If present, the conditioning system 13 is configured to maintain the temperature inside the structure 11 or at least part of the modules 3, possibly of the converter 2 as a whole, within predetermined tolerances. In this sense, therefore, the conditioning system 13 can be a ventilation or refrigeration system, optionally liquid, HVAC type chiller or cooling, positioned on the walls, on the roof and/or outside the structure 11 itself.

Conversely, converter 2 defines an output 2a in AC/alternating current.

Preferably, the converter 2 has a total power output comprised between 0.3 and 2 MW.

Again, preferably, the output 2a is a three-phase AC medium voltage output.

In addition, preferably, as shown in the various examples of FIGS. 3, 4a-4c, converter 2 includes three legs 21, 22, 23.

The legs 21, 22, 23 are three-phase and connected to output 2a. Furthermore, each of the legs 21, 22, 23 can be connected to, or comprise, a plurality of modules 3 connected in series with each other.

Preferably, the converter 2 further comprises a plurality of inductors L2a.

The inductors L2a are each suitably arranged on a respective line exiting the legs 21, 22, 23. Therefore, each leg 21, 22, 23 is preferably connected through a respective inductor to the output 2a.

In the embodiment shown in FIGS. 3 and 4a, in particular, each leg 21, 22, 23 comprises a plurality of modules 3 connected in series with each other and arranged in an upper arm 3a and a lower arm 3b. The arms 3a, 3b are also connected to each other by at least one inductor L21, L22, L23.

Still, in a further embodiment, each leg 21, 22, 23 can comprise a plurality of modules 3 connected in series with each other and arranged in arms 3a, 3b connected together by at least one inductor L21, L22, L23 and possibly a mutually coupled impedance.

Again, preferably, the converter 2 comprises a firmware control device 4 configured to modify at least output current and voltage from the modules 3.

According to the present invention, as shown in FIG. 3, each of the modules 3 preferably comprises a first stage 31 and a second stage 32.

The first stage 31 is substantially an AC output stage including a solid-state switch, also known as SSW. For example, the solid-state switch can include an IGBT device, or even a MOSFET depending, for example, on the operating voltages of the module 3.

The second stage 32 is substantially a DC/DC conversion stage.

Preferably, the first stage 31 is isolated towards the ground. Furthermore, it is able to be connected in series with other modules 3 of a leg 21, 22, 23 and able to generate an output voltage waveform.

Preferably, the second stage 32 operates in a frequency comprised between 10-100 kHz.

Again, preferably, the second stage 32 comprises a double conversion bridge 321 which feeds a transformer 322 medium frequency placed in the centre of the DC/DC module. Therefore, the second stage 32 is adapted to provide galvanic isolation.

In addition, preferably, the second stage 32 defines an input 32a.

Preferably, each module 3 further comprises at least one battery 5.

The battery 5 is advantageously connected to the input 32a.

Even more advantageously, each module 3 comprises a plurality of batteries 5. The latter, if present in a number greater than one, are preferably arranged in parallel, as shown in FIG. 5a. Alternatively, the batteries could also be arranged in series, as shown in FIG. 5b. In detail, it is preferable to arrange batteries 5 in parallel and to arrange batteries 5 in series which have a high degree of similarity or which are identical.

In other words, at least one battery 5 is associated with each module 3.

Even more in detail, each of the batteries 5 is preferably removably connected to the input 32a.

Furthermore, the battery 5 is preferably an electric vehicle battery EVB.

As is known, EVB batteries are substantially particular electric batteries, also known by the term traction batteries, which differ from starter, lighting and ignition batteries because they are designed to supply energy for prolonged periods of time.

Therefore, the battery 5 is not a part of an electric vehicle battery, but is a complete or whole EVB electric vehicle battery. For example, the battery 5 can be an electric vehicle battery EVB removed from the electric vehicle for further use, i.e., used for a second use or second-life battery (SLB). In other words, the battery 5 is not a manipulated or reconditioned battery, but is an EVB electric vehicle battery as originally marketed, i.e., as it is.

Finally, preferably, each of the modules 3 comprises at least one battery 5 connected to the input 32a through a multiple socket 51.

The latter is preferably equipped with a plurality of connectors suitable for connecting different types of batteries 5. In particular, the multiple socket 51 is configured both to allow the electrical supply to or from the battery 5, and to allow the transfer of data or signals between the battery 5 and the converter 2.

In particular, the multiple socket 51 is configured to allow communication of the battery 5, in detail of the battery management system or BMS, with the second stage 32 and therefore with the converter 2 in general.

In fact, as already mentioned, the EVB electric vehicle batteries that can be connected to the device 1 according to the present invention can be second-hand batteries, new batteries, batteries of different types and types, potentially any type of EVB battery without the need for further modifications.

In conclusion, as previously mentioned, each module 3 can be housed in its own shelving 12, or, each shelving 12 can house only the battery 5. The latter can be connected or disconnected from its own stage 32 of the respective module 3 by means of the multiple socket 51 for example allocated, for each shelf 12, on the bottom of the containment compartment of the shelving 12 made in structure 11.

Furthermore, as shown in detail in FIG. 2, the device 1 could also comprise two structures 11, one of which is dedicated to the batteries 5 and a dedicated first and second stage 31, 32 of the modules of the converter 2 placed in respective shelving 12.

In general, therefore, first and second stage 31, 32 of the modules can be external to the containment compartment of the shelving 12 in which the batteries 5 are housed in.

The operation of the device 1 previously described in structural terms is as follows. The firmware control device 4 receives the active and reactive power set-points to be determined and/or supplied to the output 2a of the converter 2, and therefore of the entire device 1, and coordinates the operation of the various modules 3 of the converter 2. Thus, communicating with the individual modules 3 and consequently with the individual batteries 5, it coordinates the operation of the individual modules 3, adapting at least the output current and voltage to the modules 3 that make up the converter 2 so as to make them work at their best on the connection in outgoing series. In this way, the capacity and characteristics of the individual EVB batteries connected, even if different, are exploited to the fullest.

In fact, considering the differences between the batteries 5 used, the device 4 is able to equalize the aging state of the batteries and calculate the equivalent state of charge of the modules 3 in order to distribute the charge of the batteries 5.

Therefore, the duration of batteries 5 is optimized and features, such as chemistry type, installed capacity, number of cycles, operating temperatures, DoD depth of discharge, and more, are exploited to the fullest.

The device 1 according to the invention achieves important advantages.

In fact, advantageously, the use of electric vehicle batteries makes it possible to simplify the structure of the device as they, by their manufacture, can be exposed directly to the outside, or exposed to the external environment, without special protections, as visible in the FIGS. 1-2.

Furthermore, thanks to the innovative modular construction of the device 1 which allows to connect different batteries, it is possible to recover and use and optimize products that otherwise would need to be disposed of, as they no longer have a use as single batteries.

In more advantageously, the device with converter is of the transformerless type, i.e., it does not use an external three-phase transformer from low to medium voltage with an operating frequency of 50 Hz or 60 Hz, but uses the characteristic of the converter 2 to directly produce the necessary output voltage. at the connection to the grid at the requested value in medium voltage. Furthermore, the system is, however, galvanically isolated from the electrical network to which it is connected thanks to the second stage 32, which is insulating, guaranteed by the small transformers operating at medium frequency present inside all the modules 3.

In conclusion, thanks to the device 4 and to the modular nature of the device 1, the entire system can be reconfigured in the event of a fault. In fact, advantageously, the device 4 can directly reconfigure the system in case of failure of one of the modules 3 or of a single battery 5. In fact, in such particular situations, the control device 4 can bypass the failed module 3, reconfiguring the values control of the other modules in series with the faulty module 3, and continue to generate the desired output waveform. In summary, the device 1 can intrinsically work in an N−1 configuration which significantly increases its availability even in the event of a fault. The invention is susceptible of variants falling within the scope of the inventive concept defined by the claims.

In this context, all the details can be replaced by equivalent elements and the materials, shapes and dimensions can be any.

The invention claimed is:

1. A modular device for the accumulation and delivery of electrical energy comprising a structure comprising
    a plurality of shelves,
    an air conditioning system, and
    at least one bi-directional multi-level electronic converter defining a transformerless type AC/alternating current output including
        three legs three-phase connected to said output and each comprising a plurality of modules connected in series,
        a plurality of inductors each arranged on a respective output line from said legs, and
        a firmware control device configured to modify at least output current and voltage from said modules,
    wherein each of said modules comprises:
    a first stage AC output including an IGBT device, isolated towards ground wire, capable of connecting in series with said other modules of a respective said leg and capable of generating an output voltage waveform,
    a second stage DC/DC conversion defining an input, and
    at least one battery connected to said input,
and
    wherein said battery is an electric vehicle battery (EVB).

2. The device according to claim 1, wherein each of said modules comprises a plurality of said batteries arranged in series.

3. The device according to claim 2, wherein each of said batteries is removably connected to said input.

4. The device according to claim 3, wherein said converter has a total power output between 0.3 and 2 MW.

5. The device according to claim 4, wherein said outlet is a three-phase AC output on medium voltage.

6. The device according to claim 5, wherein each said leg comprises a plurality of said modules connected in series with each other and arranged in an upper arm and a lower arm, said arms connected to each other by at least one inductor.

7. The device according to claim 6, wherein said arms are additionally connected to each other by at least one impedance in series with respect to said inductor.

8. The device according to claim 1, wherein each of said batteries is removably connected to said input.

9. The device according to claim 1, wherein said converter has a total power output between 0.3 and 2 MW.

10. The device according to claim 1, wherein said outlet is a three-phase AC output on medium voltage.

11. The device according to claim 1, wherein each said leg comprises a plurality of said modules connected in series with each other and arranged in an upper arm and a lower arm, said arms connected to each other by at least one inductor.

12. The device according to claim 11, wherein said arms are additionally connected to each other by at least one impedance in series with respect to said inductor.

13. The device according to claim 1, wherein said second stage operates in a frequency range of 10-100 KHz.

14. The device according to claim 1, wherein said second stage comprises a double conversion bridge which feeds a transformer in the average frequency at the centre of the DC/DC module, said second stage adapted to provide galvanic isolation.

15. The device according to claim 1, wherein each of said modules comprises at least one of said batteries connected to said input via a multiple socket equipped with a plurality of connectors suitable for connecting different types of said batteries.

* * * * *